United States Patent
Higuchi

(10) Patent No.: US 11,061,462 B2
(45) Date of Patent: Jul. 13, 2021

(54) REMOTE TERMINAL APPARATUS ENABLED TO RESET A PLUG-AND-PLAY COMPATIBLE DEVICE EVEN FIXEDLY CONNECTED WITHOUT REMOVING THE DEVICE FROM THE APPARATUS, CONTROL METHOD THEREOF, COMPUTER SYSTEM, AND NON-TRANSITORY RECORDING MEDIUM

(71) Applicant: NEC CORPORATION, Tokyo (JP)

(72) Inventor: Junichi Higuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 264 days.

(21) Appl. No.: 16/083,769

(22) PCT Filed: Mar. 22, 2017

(86) PCT No.: PCT/JP2017/011438
§ 371 (c)(1),
(2) Date: Sep. 10, 2018

(87) PCT Pub. No.: WO2017/170033
PCT Pub. Date: Oct. 5, 2017

(65) Prior Publication Data
US 2020/0301496 A1     Sep. 24, 2020

(30) Foreign Application Priority Data
Mar. 29, 2016 (JP) .............................. JP2016-066565

(51) Int. Cl.
*G06F 1/3234* (2019.01)
*G06F 1/24* (2006.01)
(Continued)

(52) U.S. Cl.
CPC .............. *G06F 1/3234* (2013.01); *G06F 1/24* (2013.01); *G06F 11/3041* (2013.01); *G06F 11/3055* (2013.01); *G06F 13/4027* (2013.01)

(58) Field of Classification Search
CPC ...... G06F 1/24; G06F 1/3234; G06F 11/3041; G06F 13/4027; G06F 11/3055; G06F 1/3287
See application file for complete search history.

(56) References Cited

U.S. PATENT DOCUMENTS 6,651,190 B1 * 11/2003 Worley ............... G06F 11/0709
                                                          709/224
7,917,681 B2     3/2011 Suzuki et al.
(Continued)

FOREIGN PATENT DOCUMENTS

| CN | 1414443 A | 4/2003 |
| CN | 1581022 A | 2/2005 |

(Continued)

OTHER PUBLICATIONS

ExpEther Consortium, Technology Deep Dive, Mar. 10, 2016, 5 pages. internet <URL : http://www.expether.org/technology.html>.
(Continued)

*Primary Examiner* — Raymond N Phan

(57) ABSTRACT

Provided a device that performs at least one of an input and an output, a device power supply control unit that controls power supply to the device, and a device power supply control instruction unit that instructs the device power supply control unit to stop power supply to the device based on an instruction from an operation unit arranged in the apparatus, wherein stopping power supply to the device makes it possible to set the device that is fixedly connected in the apparatus to a pseudo removed state.

16 Claims, 13 Drawing Sheets

(51) Int. Cl.
  *G06F 11/30* (2006.01)
  *G06F 13/40* (2006.01)

(56) References Cited

U.S. PATENT DOCUMENTS

| | | | |
|---|---|---|---|
| 8,412,875 B2 | 4/2013 | Suzuki et al. | |
| 2001/0044841 A1* | 11/2001 | Kosugi | H04L 41/069 |
| | | | 709/223 |
| 2003/0023843 A1* | 1/2003 | Heath | G06F 1/24 |
| | | | 713/2 |
| 2003/0088318 A1 | 5/2003 | Edogawa et al. | |
| 2005/0060588 A1 | 3/2005 | Araki | |
| 2006/0041611 A1 | 2/2006 | Fujita et al. | |
| 2007/0005824 A1 | 1/2007 | Howard | |
| 2007/0011374 A1* | 1/2007 | Kumar | G06F 9/4411 |
| | | | 710/105 |
| 2007/0198763 A1 | 8/2007 | Suzuki et al. | |
| 2008/0005432 A1* | 1/2008 | Kagawa | G06F 13/387 |
| | | | 710/106 |
| 2008/0244107 A1* | 10/2008 | Uno | G06F 9/4411 |
| | | | 710/15 |
| 2009/0164687 A1* | 6/2009 | Zhu | G06F 1/3203 |
| | | | 710/302 |
| 2009/0327769 A1 | 12/2009 | Hatano | |
| 2010/0115074 A1* | 5/2010 | Tapiola | H04L 12/12 |
| | | | 709/223 |
| 2010/0153643 A1* | 6/2010 | Kobayashi | G06F 3/1204 |
| | | | 711/115 |
| 2011/0153906 A1 | 6/2011 | Suzuki et al. | |
| 2011/0239209 A1* | 9/2011 | Kotani | G06F 9/45558 |
| | | | 717/171 |
| 2014/0316603 A1* | 10/2014 | Lederer | G05F 1/625 |
| | | | 700/298 |
| 2016/0217094 A1* | 7/2016 | Yokoyama | G06F 13/4295 |
| 2017/0111455 A1* | 4/2017 | Raju | H04L 67/025 |

FOREIGN PATENT DOCUMENTS

| | | |
|---|---|---|
| CN | 101145079 A | 3/2008 |
| CN | 101208680 A | 6/2008 |
| CN | 101620463 A | 1/2010 |
| CN | 104767784 A | 7/2015 |
| JP | 2003-122458 A | 4/2003 |
| JP | 2007-193636 A | 8/2007 |
| JP | 2007-219873 A | 8/2007 |
| JP | 2008-293181 A | 12/2008 |
| JP | 2012-043468 A | 3/2012 |

OTHER PUBLICATIONS

International Search Report for PCT/JP2017/011438 dated May 23, 2017 [PCT/ISA/210].

Chinese Office Action for CN Application No. 201780019666.3 dated Feb. 3, 2021 with English Translation.

* cited by examiner

FIG. 12A

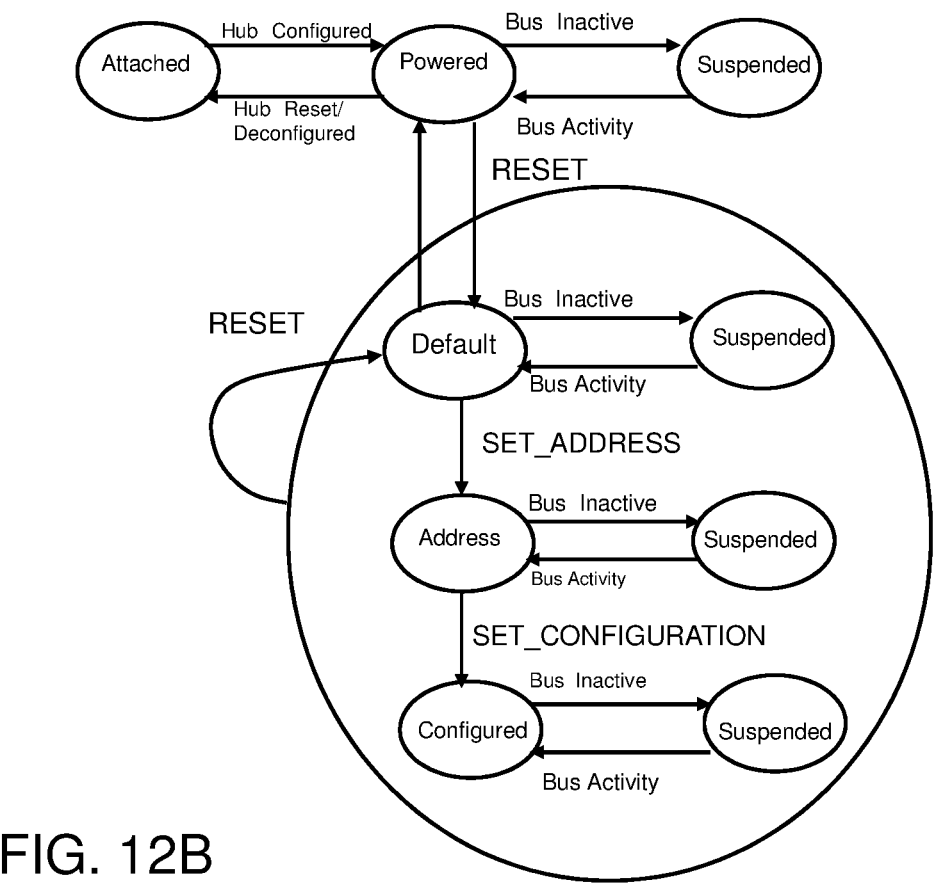

FIG. 12B

| State | Description |
|---|---|
| Attached | State in which USB device is connected to Host or Hub |
| Powered | State in which from power supply is provided to USB device from Host or Hub. |
| Default | State in which Bus reset is executed and communication with USB device is made possible. |
| Address | State in which Address of USB device is set. |
| Configured | State in which configuration of USB device is set and USB device is enabled to use. |
| Suspended | State in which Host stops communication with USB device (Bus Inactive) and USB bus is made suspended. |

REMOTE TERMINAL APPARATUS
ENABLED TO RESET A PLUG-AND-PLAY
COMPATIBLE DEVICE EVEN FIXEDLY
CONNECTED WITHOUT REMOVING THE
DEVICE FROM THE APPARATUS,
CONTROL METHOD THEREOF,
COMPUTER SYSTEM, AND
NON-TRANSITORY RECORDING MEDIUM

DESCRIPTION OF RELATED APPLICATION

This application is a National Stage of International Application No. PCT/JP2017/011438, filed on Mar. 22, 2017, which claims priority from Japanese Patent Application No. 2016-066565 (filed on Mar. 29, 2016), the entire contents of which are incorporated by reference in this application with citation.

FIELD

The present invention relates to a remote terminal apparatus, a control method thereof, a computer system, and a non-transitory recording medium.

BACKGROUND

In recent years, there have been developed products that make peripheral devices or the like compliant with PCI Express ("PCI Express" is a trademark of PCI-SIG (Special Interest Group)) available via Ethernet ("Ethernet" is registered trademark of Fuji Xerox Co., Ltd.), by passing, over Ethernet (registered trademark), a protocol of Peripheral Component Interconnect (PCI)-Express (abbreviated as "PCIe"), which is a standard of an internal expansion bus of such as a personal computer or a server.

As schematically illustrated in FIG. 11A, a PCI Express bus 314 which is an internal bus of a host 310 such as a personal computer, a server, etc. is extended by a network 331, such as Ethernet (registered trademark). An ExpEther engine (Engine) 313, which forms an interface between a PCI Express bus 314 which is an internal bus and the network 331, encapsulates a PCI Express packet from a CPU (Central Processing Unit)/chipset (Chipset) 311 with an Ethernet frame, transmits the frame to the network 331, and forwards the frame to an I/O expansion unit (Input/Output Expansion Unit) 320 via an L2 (Layer 2) switch 330, for example. The L2 switch includes a correspondence table between a port and a MAC (Media Access Control) address and based on a MAC address included as destination information in a header of the frame, by forwarding the frame to a port connected to the MAC address, forward the frame to a node that relays the frame. In an IO expansion apparatus 320, an ExpEther engine (Engine) 322 decapsulates the Ethernet (registered trademark) frame and forwards the PCI Express packet to an IO device 321 via a PCI Express bus 323. In FIG. 11A, for the sake of simplicity, one L2 switch 330 on the network 331 is provided. However, the number of L2 switches 330 is not limited to one, but as a matter of course, a plurality of L2 switches 330 may be provided.

FIG. 11B is a diagram for explaining PCI Express in the host 310 such as a server (personal computer) in FIG. 11A. In FIG. 11B, a reference numeral 311 corresponds to the CPU/chip set 311 in FIG. 11A. A card slot 315 of FIG. 11B is a card slot of the PCI Express standard. The chip set 311-2 includes, for example, a memory controller hub and an I/O controller hub. PCI is synchronous bus for transferring parallel data shared by multiple devices. In PCI Express, Peer to Peer connection is established between devices, a clock inserted in a serial data is transferred, and bidirectional (full duplex) communication is performed. In PCI Express, data is packetized and a command type is embedded in the packet. In FIG. 11B, SATA (Serial ATA (Advanced Technology Attachment)) is a hard drive interface and FSB (Front Side Bus) is a system side bus. The SDRAM (Synchronous Dynamic Random Access Memory) of the memory 312 is a clock-synchronous type memory. For example, the ExpEther engine 313 (board) of FIG. 11A is mounted in the card slot 315 of the PCI Express standard. It is also possible to connect to a USB (Universal Serial Bus) port with an interface card (not shown) connected to the card slot 315 of the PCI Express standard. A transaction layer of PCI Express generates a transaction layer packet in response to a request from a software layer and passes the packet to a data link layer. The transaction layer analyzes data from the data link layer and passes payload data to the software layer according to a command type. The transaction layer has a virtual channel (VC) as an interface with the software layer (VC can implement up to eight VC0 to VC7). Data is transmitted and received with the same VC at both ends of a link.

The IO device 321 in FIG. 11A can be composed of an arbitrary device connectable to the PCI Express bus. For example, a UI (User Interface) device such as a USB (Universal Serial Bus) compliant display described later can also be used as the IO device 321.

For example, a function that, when a device such as a peripheral apparatus, an expansion card, or the like is connected to a personal computer, automatically recognizes the device and searches for a necessary device driver to activate the driver, is called "Plug-and-Play function". The peripheral device (referred to as "USB device") connected to a USB bus, which is a serial bus standard for connecting the peripheral device to a computer, with Plug and Play function, once connected to the USB bus, can be detached freely. As a USB device, in addition to a keyboard and a mouse, an HDD (Hard Disk Drive), a CD (Compact Disc) drive, a DVD (Digital Versatile Disc) drive, a network adapter, a display, etc., each externally connected and compatible with USB connection, can be used.

Here, a procedure when a USB device is connected to a host such as a personal computer will be outlined with reference to FIG. 12A, based on the USB 2.0 specification. FIG. 12B summarizes the respective states of FIG. 12A.

When a USB cable is connected (attached) (Attached state), for example, power is supplied to a USB device from a power supply line of the USB cable (Powered state). That is, when the USB cable is connected to a USB hub, attachment is detected by either one of data lines D+ and D− of the USB bus that becomes to a power supply voltage (for example, 3.3 V).

When the host detects an attachment of the USB device, the host performs a bus reset for more than a predetermined time (RESET). That is, the host sets the data lines D+, and D− of the USB bus to $V_{OL}$ or less ($V_{OL}$: low level voltage of binary output) for a predetermined time or more.

Upon detection of RESET, the USB device performs an internal reset and transition to a default state (Default).

The host sets an address of the USB device by a set address request (a state transitions from Default to Address).

The host acquires a descriptor of a USB device (information defining operation and function of the USB device) by a get descriptor request and obtains information on the USB device. The host issues a Set Configuration request and performs device configuration. On the host, an appropriate device driver is installed based on the descriptor information of the USB device, whereby preparation of the USB device is completed, and the USB device becomes available (Configured). In USB, communication is managed on a frame-by-frame basis. A frame structure starts with SOF (Start Of Header) packet and is followed by plural transactions (composed of plural packets). The transaction includes three types of a token packet, a data packet, and a handshake packet.

The USB device, which receives a power supply from the host through the USB cable, enters a Powered state, when the USB cable is connected.

On the other hand, attachment of a self-powered USB device equipped with a power supply is detected when a power supply is on (ON). In the case of a self-powered USB device, it does not become a Powered state only by turning on the power (power on). In this case, when the power supply is on, and when the USB cable is connected, the USB device enters a Powered state.

In a case where the power supply of the self-powered USB device is off (OFF) and the USB cable is connected, when the power supply of the USB device is turned from off to on, the USB device enters a powered state.

As a related technology of a USB device, for example, in Patent Literature 1, a USB power control unit, on reception of a signal indicating that a USB device recognition unit cannot acquire a normal device ID (Identity) of a USB device from a USB port, turns off, for a predetermined time, power supply of a local expander and a remote expander, and then turns on the power supply. By turning off the power of the local expander and the remote expander for a predetermined time, the USB device is in the same state as when a USB cable connecting a host computer and the USB device is removed. Then, after turning off the power supply for a predetermined time, the USB power control unit turns on the power supply to cause the local expander and the remote expander to operate, and to make it possible for a host computer to recognize a USB device, when the USB device which is a peripheral apparatus is connected to the host with USB connection.

[Patent Literature 1]

JP patent Kokai Publication No. JP2008-293181A

[Non-Patent Literature 1]

ExpEther Consortium Technology Deep Dive, Mar. 10, 2016 search, internet <URL: http://www.expether.org/technology.html>

SUMMARY

As described in Patent Literature 1, when a USB device is connected to a host with a USB cable and the host apparatus cannot recognize the USB device, the USB cable of the USB device is once disconnected from the host and then connected again.

However, in a configuration in which a USB cable cannot be detached in order for a USB device to be once disconnected from the host, the method of Patent Literature 1 cannot be employed. For example, when a USB device is fixedly connected to a USB controller by a physical signal line on a board in an apparatus, it is impossible to detach (physically disconnect) the USB device.

If resetting should be made to a controller or a computer internal bus virtualization engine which will be described later, there may be a case where there may occur impact on a host side that could result in serious obstacles such as OS (Operating System) freeze and system crash.

The present invention has been made in view of the above problem, and one of objects of the present invention is to provide a remote terminal apparatus, method, and non-transitory recording medium, each enabling resetting without removing the apparatus, for example, even when a plug and play compatible apparatus is fixedly connected.

According to one aspect of the present invention, there is provided a remote terminal apparatus comprising: a device that performs at least one of input and output; a device power control unit that controls power supply to the device; and a device power supply control instruction unit that instructs the device power supply control unit to stop power supply to the device based on an instruction from an operation unit arranged in the apparatus, wherein stopping power supply to the device makes it possible to set the device that is fixedly connected in the apparatus to a pseudo removed state.

According to one aspect of the present invention, there is provided a control method of a device arranged in a remote terminal apparatus, the method comprising:

instructing to stop to provide power supply to the device, on reception of an instruction of stopping power supply of a device that is fixedly connected in the apparatus and performs input/output in response to an operation at an operation unit; and stopping power supply to the device, thereby making it possible to set the device to a pseudo removed state.

According to one aspect of the present invention, there is provided a non-transitory computer-readable recording medium storing therein a program causing a processor constituting a remote terminal apparatus to execute a device power control process that controls power supply to a device that is fixedly connected in the apparatus and performs input and output; and a device power supply control instruction process that instructs the device power control process to stop power supply to the device based on an instruction from an operation unit disposed in the apparatus.

According to another aspect of the present invention, there is provided a host connected via a network to a remote terminal apparatus, comprising a device monitoring unit that, on reception of an instruction to start monitoring of a connection state of a device from the remote terminal apparatus, monitors a state of the device, and notifies the remote terminal apparatus via the network that removal of the device is confirmed when detecting that that the device is removed in a pseudo manner.

According to another aspect of the present invention, there is provided a computer system comprising: a host; and a remote terminal apparatus which is an IO device virtually extending an internal bus of the host on a network, wherein the remote terminal apparatus comprises: a device that performs at least one of input and output; a device power control unit that controls power supply to the device; and a device power supply control instruction unit that instructs the device power supply control unit to stop power supply to the device based on an instruction from an operation unit disposed in the apparatus, wherein stopping power supply to the device makes it possible to set the device fixedly connected in the apparatus to a pseudo removed state.

According to still another aspect of the present invention, there is provided a non-transitory computer-readable recording medium storing therein a program executed on a host connected via a network to a remote terminal apparatus including a device that is fixedly connected to the apparatus and performs input and output to cause a processor to execute the processing comprising:

monitoring a state of the device in the remote terminal apparatus connected via the network, upon receiving an instruction to start monitoring a connection state of the device from the remote terminal apparatus; and notifying to the remote terminal apparatus that removal of the device is confirmed upon detection that the device is in a pseudo removed state in the remote terminal apparatus. According to the present invention, the non-transitory computer-readable recording medium (transitory computer readable recording medium may include a medium such as, a magnetic/optical recording medium HDD (Hard Disk Drive), a CD (Compact Disc), a DVD (Digital Versatile Disc), a semiconductor storage device or the like) in which the program is stored.

According to the present invention, it is possible to reset, for example, a plug and play compatible device fixedly connected in an apparatus, without removing the device. Effects of the present invention other than the above will be apparent to those skilled in the art from the following description.

BRIEF DESCRIPTION OF THE DRAWINGS

FIG. 12A and FIG. 12B are diagrams for explaining a state transition of a USB device.

DETAILED DESCRIPTION

Figure 13:
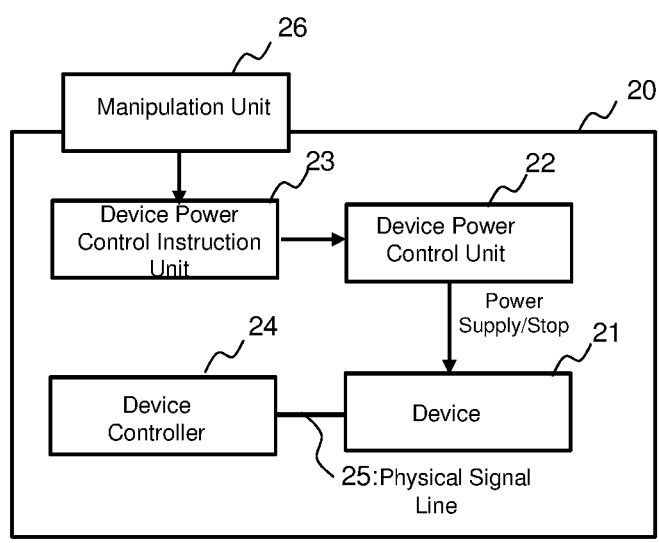
FIG. 13 is a diagram for explaining a basic concept of the present disclosure.

In the following, a basic concept of the present disclosure will be described first, then example embodiments will be described. Referring to FIG. 13, a remote terminal 20 includes a device 21 that performs at least one of input and output, a device power control unit 22 that controls power supply to the device 21, and a device power supply control instruction unit 23 that instructs the device power supply control section 22 to stop power supply to the device 21 when receiving from an operation unit 26 arranged in the apparatus 20. The device power control unit 22 stops power supply to the device 21 based on an instruction from the device power supply control instruction unit 23 and makes it possible to set the device 21 fixedly connected in the remote terminal apparatus 20 to a pseudo removed state in which the device 21 without being detached is detached (removed) in a pseudo manner. In FIG. 13, the device 21 may be fixedly connected to the device controller 24 on a substrate (not shown) in the remote terminal apparatus 20 via a physical signal line 25 such as a USB bus or the like.

According to one embodiment of the present disclosure, for example, it is made possible to reset a plug-and-play compatible device without removing the device.

According to one embodiment of the present disclosure, the device power supply control instruction unit 23 stops a power supply to the device 21, and after it is confirmed by an upper apparatus to which remote terminal apparatus 20, that the device 21 is in a pseudo removed state, the device power supply control instruction unit 23 may instruct the device power supply control unit 22 to provide power supply to the device 22.

Alternatively, the device power supply control instruction unit 23 may instruct the device power supply control unit 22 to provide power supply to the device 21 on elapse of a predetermined time after the power supply to the device 21 is stopped.

Figure 10:
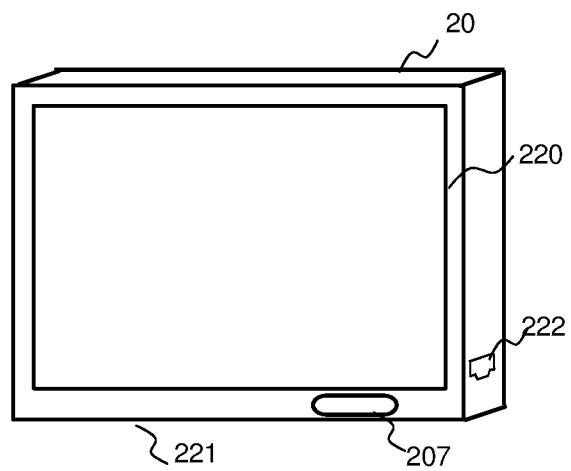
FIG. 10 is a diagram schematically illustrating an example (appearance) of a remote terminal according to an example embodiment of the present disclosure.

According to one embodiment of the present disclosure, the operation unit 26 arranged in a casing or the like of the remote terminal apparatus 20 may be constituted by a button (button switch) for instructing to stop power supply from the device power supply control unit to the device by pressing) (207 in FIG. 10).

According to one embodiment of the present disclosure, when pressing of a button (207 in FIG. 10) constituting the operation unit 26 is detected, the device power supply control instruction unit 23 may instruct the device power supply control unit 22 to stop power supply to the device 21 and instruct a host (10 in FIG. 1) to start monitoring a connection state of the device 21. In this case, upon reception of a notification from the host that pseudo removal (pseudo detachment) of the device 21 is confirmed, the device power supply control instruction unit 23 may instruct the device power supply control unit 22 to provide power supply to the device.

According to an embodiment of the present disclosure, the device 21 may be configured to receive a power supply from the device power supply control unit 22 to perform normal operation after an initialization procedure such as reset.

Figure 11A:
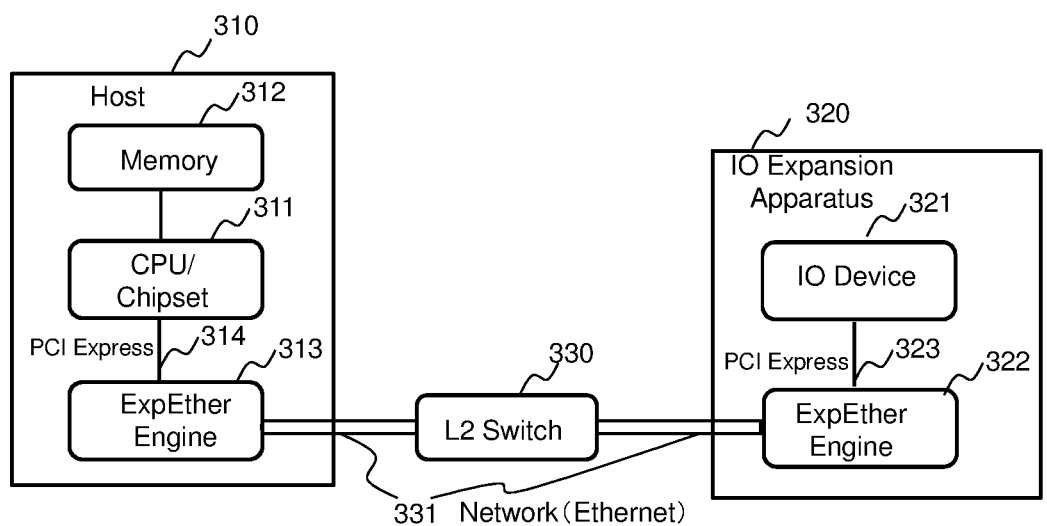
FIG. 11A and FIG. 11B schematically illustrate ExpEther and PCI Express, respectively.

According to one aspect of the present disclosure, there is provided a network interface (201 in FIG. 3) connected via a network to a host (10 in FIG. 1), and the device 21 may communicate with a processor arranged in the host as an input/output device (321 in FIG. 11A) connected to a bus (for example, 323 in FIG. 11A) that is an extended version of an internal bus of the host to a network (for example, 331 in FIG. 11A).

The device power supply control unit 22 and the device power supply control instruction unit 23 in FIG. 13 may be implemented using a program executed by a processor. In this case, each process is realized by reading a program from a semiconductor memory or HDD (Hard Disk Drive) or the like in which the program is recorded and executing the program by a processor.

A processor (CPU/chip set 101 in FIG. 1) constituting a host (10 in FIG. 10) that is connected via a network to a remote terminal apparatus 20 including a device 21 that performs input and output and that is fixedly connected to a device controller by a physical signal line(s), may be configured to execute a program to perform upon reception of an instruction to start monitoring a connection state of the device from the remote terminal apparatus, monitoring a state of the device in the remote terminal apparatus, notifying the remote terminal apparatus that removal (pseudo detachment) of the device is confirmed when it is detected that the device is in a pseudo removed state in the remote terminal apparatus.

<Example Embodiments>

Several example embodiments will be described below. In the following description, a UI device will be described as an example of an IO device, but an IO device as a matter of course is not limited only to the UI device in the present disclosure.

<System Configuration>

Figure 1:
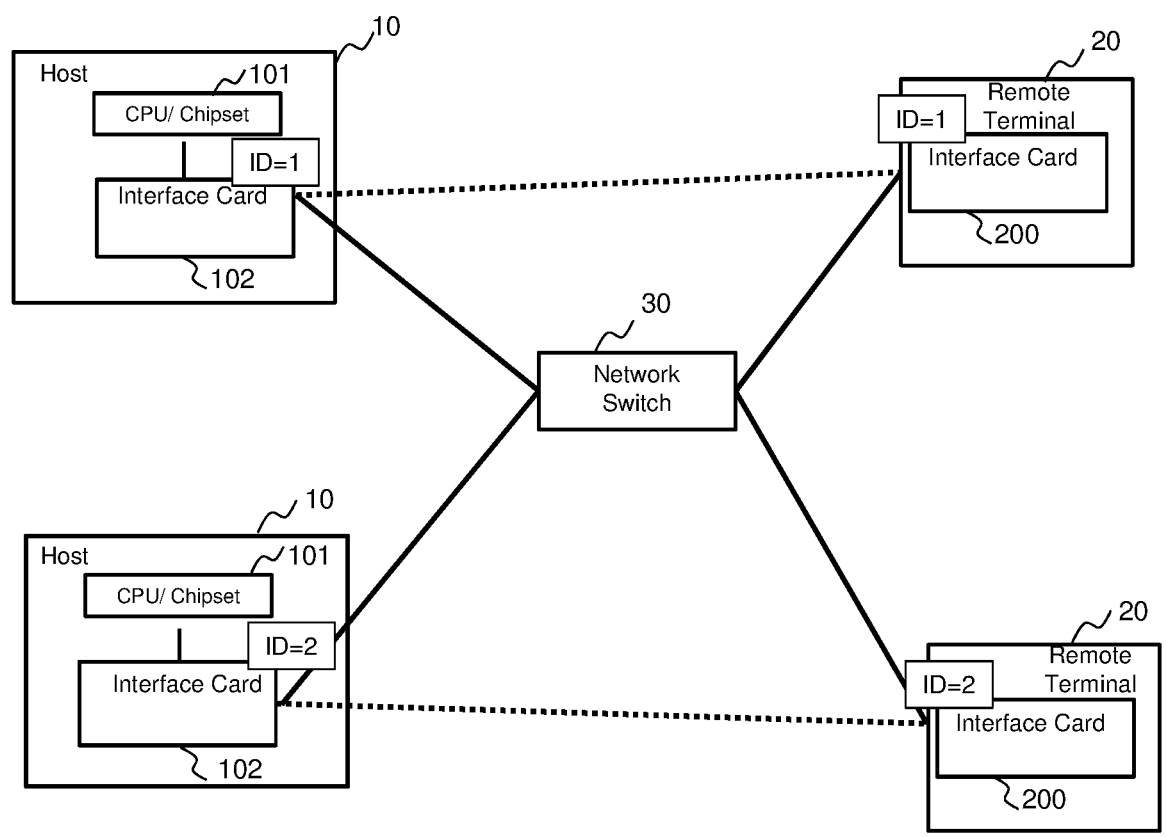
FIG. 1 is a diagram illustrating an example of a system configuration according to an example embodiment of the present disclosure.
Figure 11B:
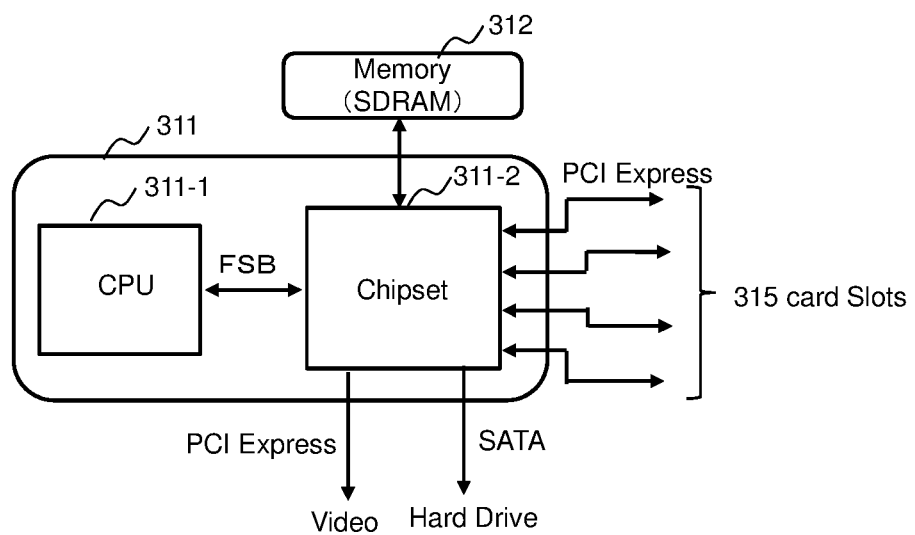

FIG. 1 is a diagram schematically illustrating a system configuration according to an example embodiment of the present disclosure. In FIG. 1, a host 10 includes a CPU/chip set 101 and an interface card 102 for communicating with a remote terminal apparatus 20 (hereinafter referred to as "remote terminal 20") via a network. In a case where the host 10 uses PCI Express as its internal bus, the CPU/chip set 101 may have a configuration as schematically illustrated in FIG. 11B, for example. A network switch 30 performs forwarding and routing between each of interface cards 102 of the plurality of hosts and each of remote terminals 20. The network switch 30 is constituted by, for example, an L2 switch, refers to a table storing correspondence between a port and a destination MAC address, determines a port connected to a destination MAC address of a header of a frame inputted to the input port, and forwards the frame to a relay destination. In FIG. 1, the number of the network switches 30, as a matter of course, is not limited to one.

The remote terminal 20 is a terminal used by a user to operate the host 10 and corresponds to the remote terminal 20 described with reference to FIG. 13. An interface card 200 of the remote terminal 20 has a unique ID (identifier: Identity). The remote terminal 20 is connected to the interface card 102 of the host 10 having the same ID as that of the interface card 200. As illustrated by a broken line in FIG. 1, the remote terminal 20 and the host 10 with interface cards of ID=1 are connected each other, and the remote terminal 20 and the host 10 with interface cards of ID=2 are connected each other.

<Host>

Figure 2:
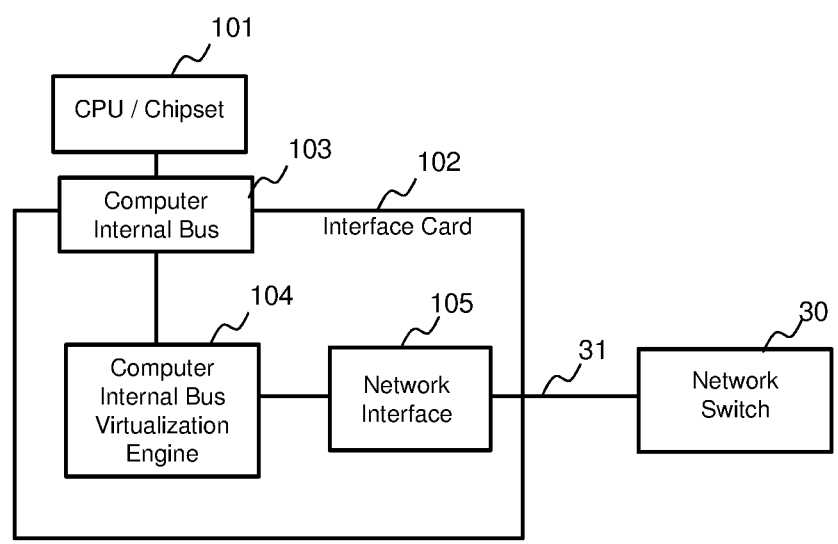
FIG. 2 is a diagram illustrating an example of a configuration of a host according to an example embodiment of the present disclosure.

FIG. 2 is a diagram illustrating an example of a configuration of the host 10 according to an example embodiment of the present disclosure. Referring to FIG. 2, in the host 10, a computer internal bus 103 is an internal bus connected to a CPU/chip set 101 and a computer internal bus virtualization engine 104. The computer internal bus 103 may be constituted by the above described PCI Express bus, for example.

A computer internal bus virtualization engine 104 performs a processing (for example, encapsulation) to process signals of the computer internal bus 103 so that the signals can be transferred through the network 31 via the network interface 105. In addition, the computer internal bus virtualization engine 104 performs processing (for example, decapsulation) to process signals received from the network 31 via the network interface 105 so that the signals can be transferred on the computer internal bus 103. The network interface 105 is an interface that connects to the network switch 30 via the network 31 and communicates with the remote terminal 20 that is a connection destination. The network interface 105 may be configured by, for example, an Ethernet (registered trademark) interface. In this case, the network interface 105 and the computer internal bus virtualization engine 104 can be made to correspond to the ExpEther engine 313 in FIG. 11A. The CPU/chip set 101 can also correspond to the CPU/chip set 311 in FIGS. 11A and 11B.

<Remote Terminal>

Figure 3:
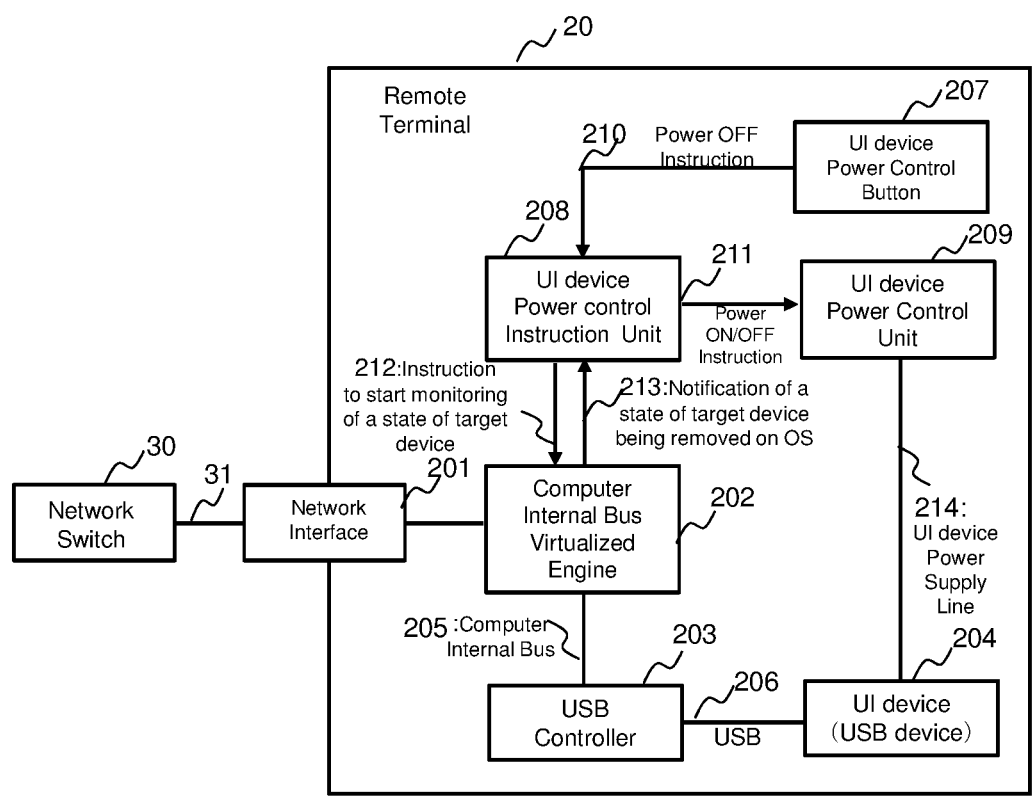
FIG. 3 is a diagram illustrating an example of a configuration of a remote terminal according to an example embodiment of the present disclosure.

FIG. 3 is a diagram illustrating an example of a configuration of the remote terminal 20 according to an example embodiment of the present disclosure. In FIG. 3, a network interface 201 is an interface for communicating with the host 10 (FIG. 1) via the network switch 30 and via the network 31. The network interface 201 may be configured by, for example, an Ethernet (registered trademark) interface. The network interface 201 is included in the interface card 200 of FIG. 1.

A computer internal bus virtualization engine 202 processes a signal (frame) received from the network 31 via the network interface 201 (for example, decapsulation, or extraction of data between a frame header and FCS (Frame Check Sequence)) such that the signal can be transferred on the computer internal bus 205. The computer internal bus virtualization engine 202 performs processing (for example, encapsulation) to process a signal of the computer internal bus 205 such that the signal can be transferred within the network 31 via the network interface 201. The network interface 201 may be configured by, for example, an Ethernet (registered trademark) interface. In this case, the network interface 201 and the computer internal bus virtualization engine 202 can also correspond to the ExpEther engine 322 in FIG. 11 A.

A USB controller 203 is a device controller to control the USB device and to transmit and receive data. The USB controller 203 is connected to a computer internal bus 205. An internal configuration of the USB controller 203 is not illustrated, but as with a normal USB controller, the USB controller 203 includes a transceiver connected to a USB bus, a serial interface engine (SIE), a first-in first-out (FIFO) buffer, an upper side interface to connect to the computer internal bus 205. The upper layer interface converts a signal output from the computer internal bus virtualization engine 202 to the computer internal bus 205 into a USB packet format to serially transmit the signal to the USB bus 206. The upper layer interface also converts the signal received from the USB bus 206 (USB frame) into a signal adapted to be transferred to the computer internal bus 205 and outputs the signal to the computer internal bus virtualization engine 202. The USB controller 203 may be configured to detect attachment based on voltage level of data line (D+, D−) of the USB bus 206 and perform bus reset in a state of power-on (Powered).

The UI device 204 is a USB device for a user interface (for example, a screen display output or an operation input). Although not particularly limited, the UI device 204 is mounted on a board (not shown) and is fixedly connected to the USB controller 203 via the USB bus 206 (in this case, the UI device 204 cannot be detached from the USB controller 203). Although not particularly limited, the UI device 204 may be a USB monitor (display) as exemplified in FIG. 10, for example.

The UI device power supply control button 207 may be configured as a button (push button switch) installed outside a casing 221 of the remote terminal 20 as shown in FIG. 10, for example. The UI device power supply control button 207 is an operation unit (26 in FIG. 13) for resetting the UI device 204. The UI device power control button 207 may be constituted by a pushbutton switch momentary-on (off) normally open (closed), which is turned on (or off) only while an operator (user) presses the button. However, the UI device power control button 207 may be an alternate action pushbutton switch which holds an on (or off) state even when an operator releases his hand after pressing the button and returns to an original state when the button is pressed again.

Although not particularly limited, in the example illustrated in FIG. 10, the remote terminal 20 is configured as a monitor terminal having a display as a USB device. In FIG. 10, reference numeral 220 denotes a display screen of a liquid crystal or the like. Reference numeral 222 denotes a LAN (Local Area Network) cable terminal (receptacle), which is connected to a network interface (201 in FIG. 3) inside a casing 221. It is a matter of course that the UI device power control button 207 may be provided on a side surface or the like instead of a lower side of a front of the casing 221.

Referring again to FIG. 3, when an operator manipulates (presses) the UI device power control button 207, the "power off instruction" of the UI device 204 is output to the signal line 210.

The UI device power control button 207 may be constituted by a momentary type pushbutton switch (normally off). In this case, when a long push operation for more than a predetermined time is performed by an operator, the "power off instruction" of the UI device 204 may be output (asserted) to the signal line 210. Although not particularly limited, the "power off instruction" on the signal line 210 may be configured as a 1-bit logic signal, for example, wherein activation of the "power off instruction" is set to a high level and inactivation thereof is set to a low level, for example. When the UI device power supply control button 207 is pressed, the signal line 210 may be pulled up to a power supply potential. However, the "power off instruction" from the UI device power supply control button 207 may be transmitted by a command.

In response to a "power off instruction" from the UI device power supply control button 207, the UI device power supply control instruction unit 208 outputs "Power OFF instruction" of the UI device 204 on the signal line 211 targeted to the UI device power control unit 209.

In response to an output of a "power off instruction" from the UI device power supply control button 207, the UI device power supply control instruction unit 208 may output a target device state monitoring start instruction 212 in order to cause a state monitoring software (not shown in FIG. 1) operating on OS (operating system) of the host 10 of FIG. 1, to start monitoring of connection state of the UI device 204.

The target device state monitoring start instruction 212 is composed of a command or a signal and is supplied from the UI device power supply control instruction unit 208 to the computer internal bus virtualization engine 202. The target device state monitoring start instruction 212 is encapsulated in, for example, an Ethernet (registered trademark) frame, by the computer internal bus virtualization engine 202 and transmitted to the host 10 via the network interface 201 and the network switch 30 and the network interface 105 to the computer internal bus virtualization engine 104. The computer internal bus virtualization engine 104 decapsulates the Ethernet (registered trademark) frame and transmits a PCI Express packet (command type=target device state monitoring start instruction) of a data portion of the frame to the CPU/chip set 101 (FIG. 1). As a result, the target device state monitoring start instruction is notified to the state monitoring software operating on a CPU of the CPU/chip set 101 (FIG. 1).

Upon receipt of a target device removed state notification (notification of a pseudo removal state (pseudo detached state)) 213 from the state monitoring software (110 of FIG. 4) of the host 10, the UI device power supply control instruction unit 208, outputs a "power ON instruction" on the signal line 211 to the UI device power control unit 209.

The UI device power supply control unit 209 controls power supply to the UI device 204 in accordance with the "power ON/OFF instruction" output from the UI device power supply control instruction unit 208. When the "power ON/OFF instruction" is an instruction to turn on the power, a power supply voltage for the UI device 204 is supplied to the UI device power supply line 214.

The UI device power supply control unit 209 may include a power supply unit for the device therein. Alternatively, the UI device power supply control unit 209 may be a switch connected to a power supply line from a common power supply in the remote terminal 20 and controlling supply and stop of power to the UI device 204. When the "power ON/OFF instruction" from the UI device power supply control instruction unit 208 is OFF, the UI device power supply control unit 209 sets the potential of the UI device power supply line 214 to a ground potential or the like.

The "power ON/OFF instruction" outputted from the UI device power supply control instruction unit 208 to the signal line 211 corresponds to "power ON/OFF instruction" corresponding to the power supply to the UI device 204 and the power supply stop and the level (state) may be maintained. Alternatively, when the power supply ON/OFF is switched, a command of "power supply ON/OFF instruction" is output to the UI device power supply control unit 209 for a predetermined period of time, and in response to this command, the UI device power supply control unit 209 turns the power ON/OFF instruction may be held. In this case, the UI device power supply control instruction unit 208 needs to maintain the state of the power supply ON and power OFF on the signal line 211 over the entire period of the power supply and the power supply stop in the UI device power supply control unit 209 Absent.

<Configuration of Host>

Figure 4:
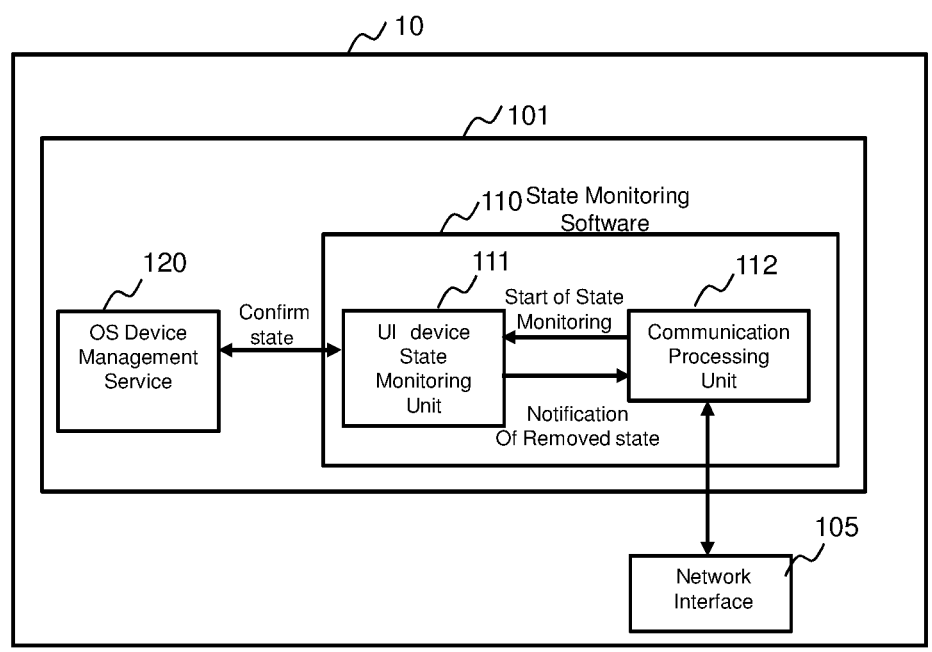
FIG. 4 is a diagram illustrating an example of a configuration of a host according to an example embodiment of the present disclosure.

FIG. 4 is a diagram illustrating an example of a configuration of the host 10 (see FIG. 1 and FIG. 2) according to one embodiment of the present disclosure. In FIG. 4, a communication processing unit 112 performs communication processing with the remote terminal (20 in FIG. 3) via the network interface 105.

A UI device state monitoring unit 111 starts checking a state of a target UI device in response to a state monitoring start instruction from the remote terminal (20 in FIG. 3). The UI device state monitoring unit 111 checks a current state of the target UI device managed by a device management service 120 of an OS. The device management service 120 (device manager) of the OS, for example, performs displaying of device driver(s) installed in the host 10, updating of the device driver, checking whether a hardware of a device is functioning properly, and changes a hardware setting. The UI device state monitoring unit 111, the communication processing unit 112, and the device management service 120 of the OS are software and software service modules of the OS executed by the CPU of the CPU/chip set 101 in FIG. 1 and FIG. 2.

The device management service 120 of the OS checks a state of a target UI device, for example, when the target UI device becomes unrecognizable on the OS (for example, when the target UI device is taken out and changed from a connected state to a disconnected state) and sets the state of the target UI device in a device management table (not shown) to "removed". The device management service 120 of the OS makes query to a USB controller 203 of the remote terminal 20 about a state of the UI device 204 via the network interface card 102 and the network switch 30, for example. When no power is supplied to the UI device 204 and the USB controller 203 notifies the device management service 120 of the OS that the UI device 204 is not attached, the device management service 120 of the OS determines that the UI device 204 is removed (the UI device 204 is physically connected to the USB controller 203 but it is pseudo-separated) and updates the device management table to "removed state".

<Example of Operation>

Figure 5:
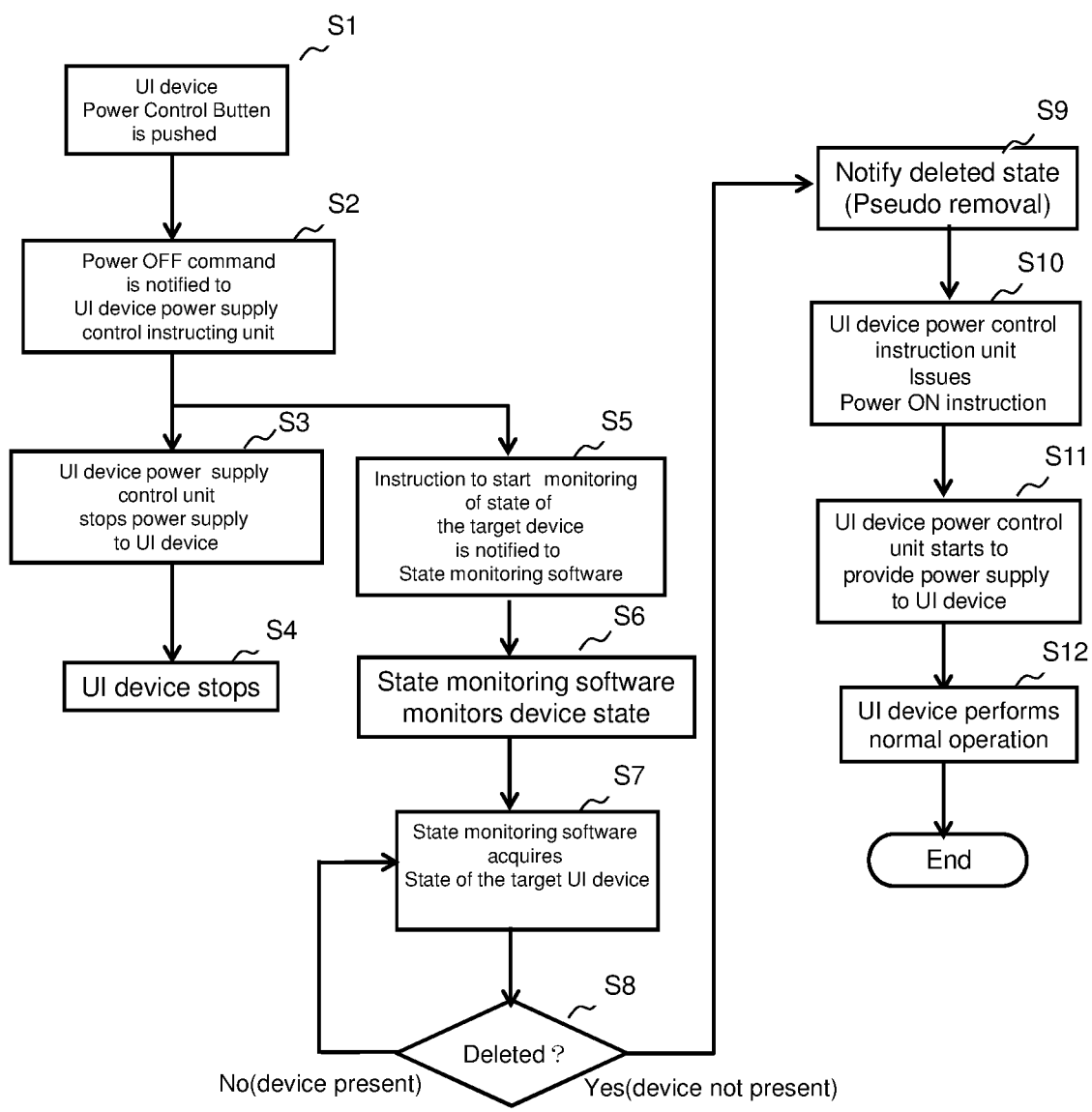
FIG. 5 is a flowchart illustrating an operation of an example embodiment of the present disclosure.

FIG. 5 is a flow chart for explaining an example of the operation of the example embodiment of the present disclosure. This corresponds to a procedure in a case where a failure occurs in the UI device and it is desired to recover from a failure. The operation of one embodiment of the present disclosure will be described with reference to FIGS. 3 to 5.

The UI device power supply control button 207 is pressed (Step S1).

"Power OFF instruction" is notified from the UI device power supply control button 207 to the UI device power supply control instruction unit 208 (Step S2).

The UI device power source control instruction unit 208 instructs the power OFF of the UI device 204 as a "power ON/OFF instruction" to the UI device power control unit 209 (Step S3). The UI device power supply control unit 209 stops power supply to the UI device 204.

The UI device 204 whose power supply is stopped stops its operation (Step S4).

The UI device power source control instruction unit 208 notifies "state monitoring start instruction" of the UI device 204 to the state monitoring software (110 of FIG. 4) of the host 10 (Step S5), while outputting to the UI device power supply control unit 209 an instruction to turn off the power The state monitoring software (110 in FIG. 4) of the host 10 starts monitoring a state of the UI device 204 (Step S6).

The state monitoring software (110 in FIG. 4) obtains a state of the UI device 204 from the device management service (120 in FIG. 4) of the OS (Step S7).

When the state of the UI device 204 is "removed" (also referred to as removal due to a pseudo detachment of the UI device 204, also referred to as "pseudo removal") (Yes in step S8), the state monitoring software (110 in FIG. 4) notifies removal (pseudo removal) of the UI device 204 to the UI device power supply control instruction unit 208 of the remote terminal 20 (Step S9).

Upon reception of a notification of removal (pseudo removal) of the UI device 204 from the state monitoring software (110 in FIG. 4), the UI device power supply control instructing section 208 issues a power ON instruction as "power ON/OFF instruction" to the UI device power supply control unit 209" (Step S10).

The UI device power supply control unit 209 starts to provide power supply to the UI device 204 (Step S11).

The UI device 204 enters a powered state, and after initialization operation such as resetting, starts a normal operation (Step S12).

Figure 6:
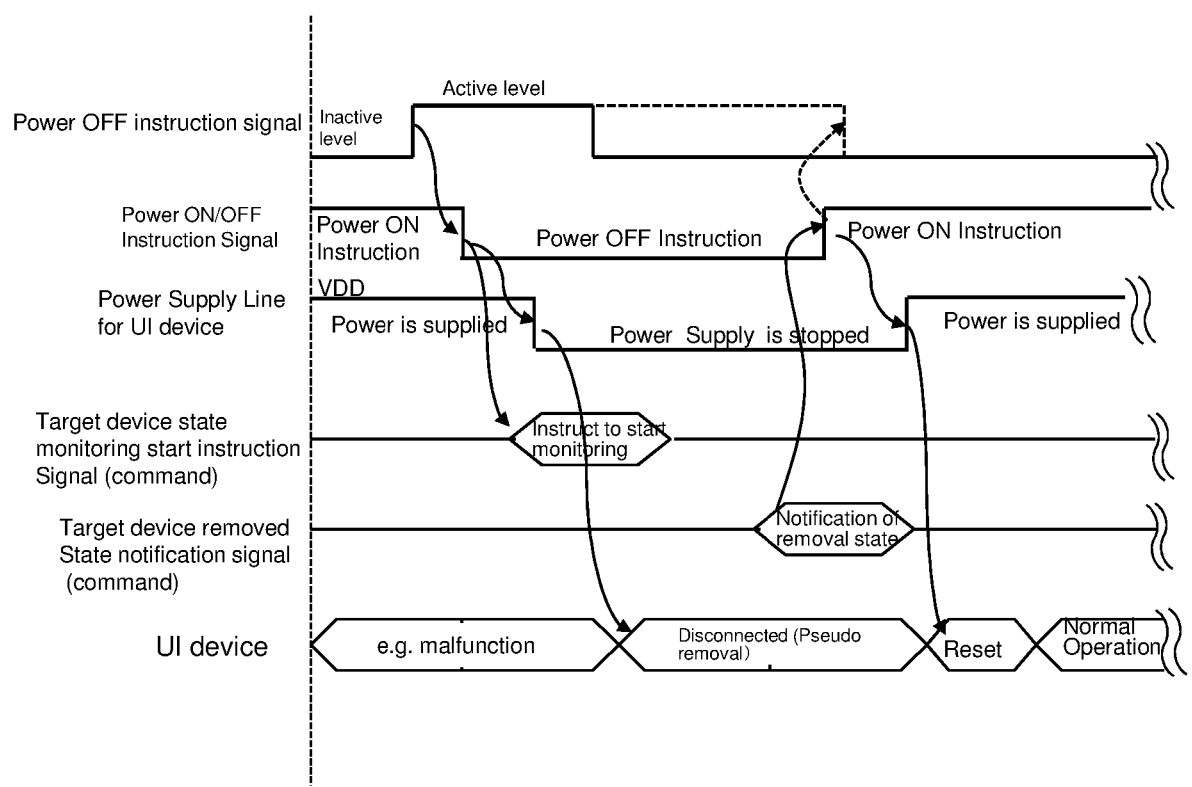
FIG. 6 is a diagram schematically illustrating an example of an operation of an example embodiment of the present disclosure.

FIG. 6 is a diagram for schematically explaining an example of temporal transition of the operation of the example embodiment of the present disclosure. In FIG. 6, a power OFF instruction signal is a signal ("power OFF instruction") of the signal line 210 in FIG. 3 and a power ON/OFF instruction signal is a signal of the signal line 211 ("power ON/OFF instruction"), a voltage of the UI device power supply line 214 (VDD is the power supply voltage of the UI device 204), a target device state monitoring start instruction signal (command) is the target device state monitoring start instruction 212 of FIG. 3, and the target device removed state notification signal (command) is the target device removed state notification 213 from the OS in FIG. 3, and a UI device designates a state of the UI device 204 in FIG. 3.

In FIG. 6, a time period of each signal is merely for explanation (a clock signal for synchronization and the like is not shown). For the sake of making the drawing easier to see, signals, events, and the like are generated using edges of transitions of other signals, events, as triggers, but this does not mean implementation by an edge triggered type circuit (for example, level sensing circuit may be used). The following describes the operation of the example embodiment of the present disclosure with reference to FIGS. 3, 4, and 6.

When the power control button 207 for the UI device of the remote terminal 20 is pressed (long press of a button switch or the like is detected), a power OFF instruction signal (power OFF instruction of 210 in FIG. 3) from the UI device power control button 207 is transitioned from an inactive state to an active state. Although not particularly limited, it is assumed that the UI device power supply control button 207 is pressed (long pressed) in order to handle, for example, a malfunction of the UI device 204.

The power OFF instruction signal output from the UI device power supply control button 207 may be a pulse-like signal (is made to an activation level for a predetermined period). Alternatively, when the power-OFF instruction signal changes from an inactive level to an active level, the power-OFF instruction signal holds the active level as it is (set state) as indicated by a broken line, and in response to the power OFF instruction signal from the UI device power supply instructing unit 208, the power-OFF instruction signal is caused to reset from the active level to the inactive level. When the UI device power supply control button 207 is configured by a momentary type push button switch, the UI device power supply control button 207 may include a detection circuit configured to detect that the button switch is pressed for a predetermined time or more and a signal generation circuit configured to output a power OFF instruction signal (pulse) of an active level at a point in time when the detection circuit has been pressed for the predetermined time.

In response to a transition of the power OFF instruction signal from an inactive state (inactive level) to an active state (active level), the UI device power supply control instructing section 208 transitions a power ON/OFF instruction signal form the "power ON instruction" to "power OFF instruction". In FIG. 6, the power ON instruction is shown as High level and the power OFF instruction is shown as Low level, but the logic level of the signal is not limited to this. The power ON/OFF instruction may, as a matter of course, a be a command.

The UI device power supply control instruction unit 208 further outputs "status monitoring start instruction" of the UI device 204. In response to the power OFF instruction from the UI device power supply control instruction unit 208, the UI device power control unit 209 stops power supply to the UI device power supply line 214. As a result, the UI device 204 is no longer in a Powered state (power-on state). That is, the UI device 204 is in a state of being disconnected from the USB controller 203 and is in a state of pseudo removal (detached). That is, the UI device 204 is in a removed state (pseudo removal state) as seen from the device management service (120 in FIG. 4) of the OS of the host 10. The state monitoring software (110 in FIG. 4) of the host 10 acquires "removal" (pseudo removal) as a state of the UI device 204 from the device management service of the OS (120 in FIG. 4).

On reception of a notification of "removal" of the UI device 204 (the target device removed state notification signal indicates a removed state notification) from the state monitoring software (110 of FIG. 4) of the host 10, the UI device power supply control instruction unit 208 switches "power ON/OFF instruction" of the signal line 211 to "power ON instruction".

In response to the "power ON instruction" from the UI device power supply control instructing section 208, the UI device power supply control unit 209 sets the UI device power supply line 214 to the power supply potential and restarts power supply from the UI device power supply line 214 to the UI device 204.

The UI device 204, to which the power is supplied is in the Powered state (power-on state), performs a reset process of FIG. 12 A, and then performs a normal operation.

As described above, according to the present example embodiment, by temporarily stopping power supply of the UI device, the UI device is set to a removed state in a pseudo manner, and after the device management service (120 of FIG. 4) of the OS of the host 10 after confirming that the status of the UI device is "removed", power supply is restarted, and the UI device is reset.

For example, when resetting the USB controller 203 or the computer internal bus virtualization engine 202, there are cases where the system is seriously affected, such as freezing of an OS. Contrary to this, according to the present example embodiment, it is possible to reset the UI device 204 built-in remote terminal 20 to be recovered without affecting PCI Express or the like which is an internal bus of the host 10 (extended to the remote terminal 20 via a network), where UI device 204 is mounted on a board in the remote terminal 20 and it is impossible to detach the UI device 204 itself).

<Another Example Embodiment>

Another example embodiment of the present disclosure will be described with reference to the drawings. In the present example embodiment, the configuration of the network system and the configuration of the host are the same as the configurations illustrated in FIG. 1 and FIG. 2 referred to in the above example embodiment. In the present example embodiment, the UI device state monitoring unit 111 described with reference to FIG. 4 is made unnecessary in the host 10.

Figure 7:
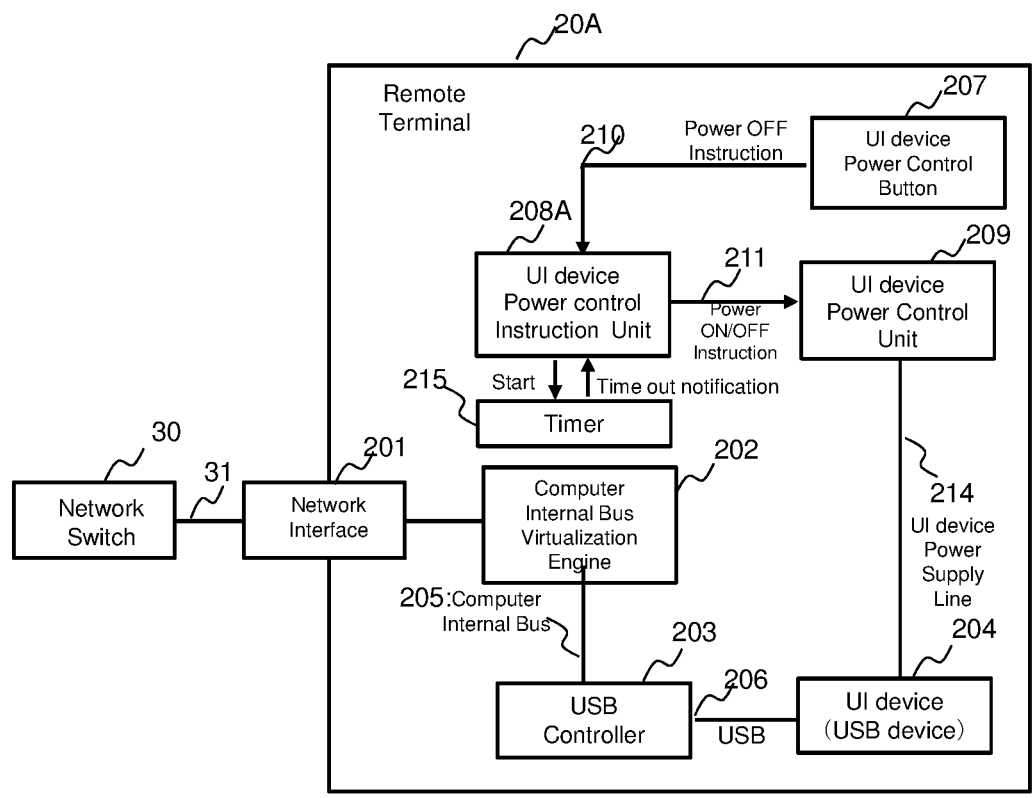
FIG. 7 is a diagram illustrating an example of a configuration of a host according to a second example embodiment of the present disclosure.

FIG. 7 is a diagram for explaining the configuration of the remote terminal 20A of the present example embodiment. In FIG. 7, the same reference numerals are assigned to the same elements as those in FIG. 3 to which a reference is made in the description of the remote terminal 20 of the above described example embodiment. Hereinafter, the difference between the remote terminal 20 A of the present example embodiment and the remote terminal 20 of the above described example embodiment will be mainly described, and the description of the same portions will be omitted for avoiding duplication.

Referring to FIG. 7, in response to the power OFF instruction output from the UI device power supply control button 207 to the signal line 210, the UI device power supply control instruction unit 208A outputs an instruction to turn off the power on the signal line 211 to the UI device power supply control unit 209, and starts time counting by the timer 215.

Then, in response to t a notification of occurrence of timeout in the timer 215, the UI device power supply control instruction unit 208A outputs an instruction to turn on the power to the signal line 211 to the UI device power source control unit 209. A time period of the timeout of the timer 215 is preferably set to a time corresponding to a period during which a state of the UI device 204 is updated to "removed" or more in the device management service (120 of FIG. 4) of the OS of the host 10. As a result, even when power supply to the UI device 204 is resumed after the power supply to the UI device 204 is stopped, the UI device 204 can be reset, without affecting any negative influence on the PCI Express, which is an internal bus of the host 10.

In addition, as compared with the above-described first embodiment, just as much as that the UI device power supply control instruction unit 208A is not needed to notify to the state monitoring software of the host 10, the state monitoring start instruction of the UI device 204, and that there is no notification of the removed state from the status monitoring software, a processing load of the computer internal bus virtualization engine 202 and the like and a network load can be reduced, and a configuration can also be simplified. However, it is necessary to set a timeout period of the timer 215 to a time with sufficient margin so that management inconsistency does not occur in the device management service (120 of FIG. 4) of the OS of the host 10.

Figure 8:
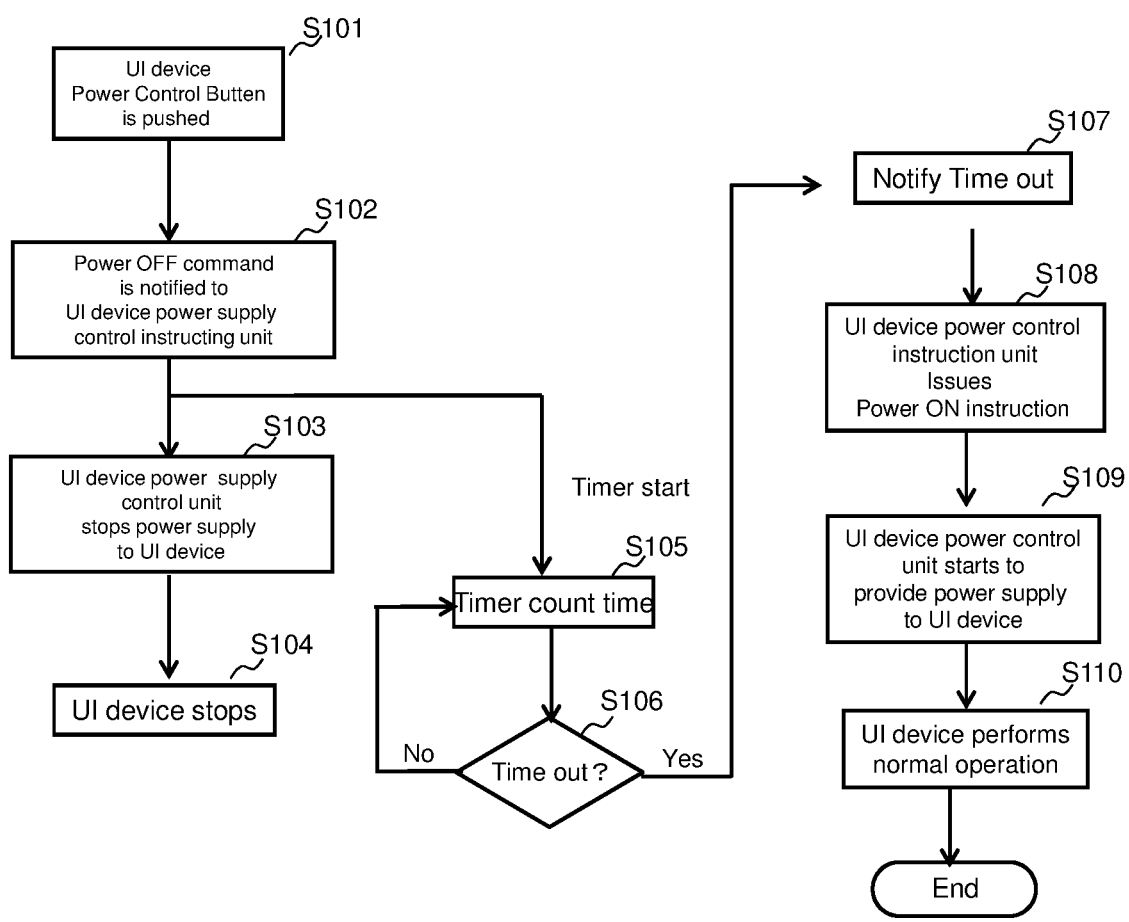
FIG. 8 is a flowchart illustrating the operation of the second example embodiment of the present disclosure.

FIG. 8 is a flowchart for explaining the operation of the present example embodiment. This is a procedure in a case where a failure occurs in the UI device and it is desired to recover from the failure. The operation of the present example embodiment will be described with reference to FIGS. 7 and 8.

The UI device power supply control button 207 is pressed (Step S101).

The UI device power supply control instruction button 208 notifies the UI device power supply control instruction unit 208 A of the power OFF instruction (Step S102). The power OFF instruction signal output from the UI device power supply control button 207 may be a pulse-like signal (becomes a predetermined level for a predetermined period). Alternatively, when the power-OFF instruction signal transitions to an active level from an inactive level, the active level is kept as it is (set state) as indicated by a broken line, and in response to a power-OFF instruction signal from the UI device power supply control instructing section 208A, transition (reset) from the active level to the inactive level may be performed.

The UI device power source control instruction unit 208 A instructs the UI device power control unit 209 to turn off the power to the UI device 204 (Step S103).

The UI device 204 with power supply stopped stops an operation (Step S104).

The UI device power supply control instruction unit 208 a starts time counting of the timer 215 together with outputting an instruction to turn off power to the UI device power control unit 209 (Step S105).

When a timeout occurs in the timer 215 (Yes in step S106), the timer 215 notifies the UI device power source control instruction unit 208A of the timeout (Step S107).

Upon receipt of the timeout notification from the timer 215, the UI device power source control instruction unit 208A outputs the power ON instruction to the UI device power source control unit 209 (Step S108).

The UI device power supply control unit 209 starts to provide power supply to the UI device 204 (Step S109).

The UI device 204 enters a Powered state (power-on state), and after initialization operation such as resetting, starts a normal operation (Step S110).

Figure 9:
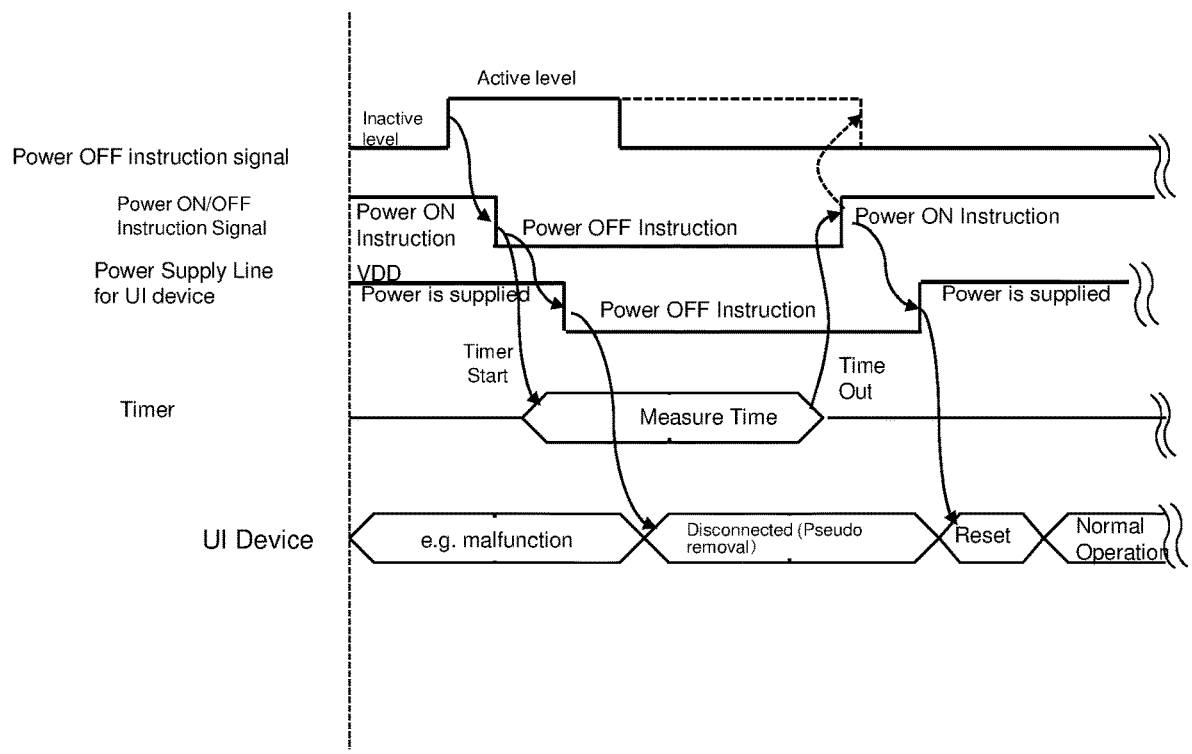
FIG. 9 is a diagram schematically illustrating an example of an operation of the second example embodiment of the present disclosure.

FIG. 9 is a diagram for schematically explaining an example of the operation of this embodiment. In FIG. 9, time periods and the like of respective signals are for the sake of illustration just as in FIG. 6 (clock signals for synchronization and the like are not shown). In order to make the drawing easier to see, the generation of other signals, events, and the like are described using edges of transitions of signals, events etc. as triggers, but this does not mean implementation by an edge trigger type circuit. Hereinafter, the operation of the example embodiment of the present disclosure will be described with reference to FIGS. 7 and 9.

When the UI device power control button 207 of the remote terminal 20 is pressed (long pressed) in order to handle, for example, a malfunction of the UI device 204, a power OFF instruction signal (line 210 of FIG. 7: "power OFF instruction") changes from an inactive state to an active state. The power supply OFF instruction signal may be a pulsed signal having an active level for a predetermined period of time or may be transitioned from the active state to the inactive state in response to the output of the power ON instruction from the UI device power supply control instructing portion 208A (refer to the power OFF instruction signal as indicated by a broken line).

In response to the transition to an activation of the power OFF instruction signal, the UI device power source control instructing unit 208A transitions a power ON/OFF instructing signal (signal line 211 in FIG. 7: "power ON/OFF") to the UI device power source control unit 209 OFF instruction") from a power ON instruction to a power OFF instruction. In FIG. 9, as in FIG. 6, the power ON instruction is shown as High level and the power OFF instruction is shown as Low level, but the signal logic is not limited to this. The power ON/OFF instruction may, as a matter of course, be a command.

The UI device power supply control instruction unit 208A starts time counting by the timer 215.

In response to the power OFF instruction from the UI device power supply control instruction unit 208A, the UI device power control unit 209 stops the power supply to the UI device power supply line 214. As a result, the UI device 204 is no longer in the Powered state. That is, the UI device 204 is disconnected from the USB controller 203 and is in a pseudo-detached state (pseudo-removed state as viewed from the host 10).

In response to a timeout occurrence in the timer 215, the UI device power supply control instruction unit 208A switches the "power ON/OFF instruction" of the signal line 211 to the power ON instruction. In response to the power ON instruction from the UI device power supply control instruction unit 208A, the UI device power control unit 209 restarts the power supply from the UI device power supply line 214. The UI device 204 to which the power is supplied enters a Powered state, performs the reset process of FIG. 12A, and then performs a normal operation.

Also, in the present example embodiment, as in the above described embodiment, it is possible to reset a UI device included (for example, mounted on a board or the like) in the remote terminal 20 with no influence on PCI Express which is an internal bus of the host 10 (extended to the remote terminal 20 via a network).

In each of the above embodiments, a USB device having a plug and play function has been described as an example, but it goes without saying that the present disclosure is not limited to this configuration. For example, the UI device may be an IO device connected via RS232C (Recommended Standard 232C) interface. It goes without saying that the computer internal bus is not limited to PCI Express.

The above-described embodiments may be attached as follows (but not limited to the following).
(Supplementary Note 1)
A remote terminal apparatus comprising:
  a device that performs at least one of input and output;
  a device power control unit that controls power supply to the device; and
  a device power supply control instruction unit that instructs the device power supply control unit to stop power supply to the device based on an instruction from an operation unit arranged in the apparatus,
  wherein stopping power supply to the device makes it possible to set the device that is fixedly connected in the apparatus to a pseudo removed state.
(Supplementary Note 2)
The remote terminal apparatus according to supplementary note 1, wherein the device power supply control instruction unit, on elapse of a predetermined time after instructing the device power supply control unit to stop the power supply to the device, instructs the device power supply control unit to provide power supply to the device.
(Supplementary Note 3)
The remote terminal apparatus according to supplementary note 1, wherein the device power supply control instruction unit, after it is confirmed that the power supply to the device is stopped and the device is in a pseudo removed state by an upper apparatus to which the remote terminal apparatus connects, instructs the device power supply control unit to provide power supply to the device.
(Supplementary Note 4)
The remote terminal apparatus according to any one of supplementary notes 1 to 3, wherein the operation unit includes a button configured to instruct to stop power supply to the device responsive to pressing down of the button.
(Supplementary Note 5)
The remote terminal apparatus according to supplementary note 4, wherein when the button is pressed, the device power supply control instruction unit instructs the device power supply control unit to stop power supply to the device, and instructs a host to which the remote terminal apparatus connects to start monitoring of a connection state of the device, and wherein
  the device power supply control instruction unit instructs the device power supply control unit to provide power supply to the device upon reception of notification from the host that the device is confirmed to be in a pseudo removed state.
(Supplementary Note 6)
The remote terminal apparatus according to any one of supplementary notes 1 to 5, wherein after power supply is stopped, when receiving power supply from the device power control unit, the device performs initialization procedure and then performs normal operation.
(Supplementary Note 7)
The remote terminal apparatus according to any one of supplementary notes 1 to 6, comprising a network interface for connecting to the host via a network, wherein the device communicates with a processor of the host as an input/output device connected to a bus that extends an internal bus of the host to the network.
(Supplementary Note 8)
A host connected via a network to the remote terminal apparatus according to any one of supplementary notes 1 to 7, wherein the host comprises means that when the host receives an instruction to start monitoring the connection state of the device from the remote terminal apparatus, the host monitors a state of the device, and when detecting that the device is removed in a pseudo manner, notifies the remote terminal device that pseudo removal of the device is confirmed.
(Supplementary Note 9)
A computer system comprising:
  a host; and
  a remote terminal apparatus which is an TO device virtually extending an internal bus of the host on a network,
    wherein the remote terminal apparatus comprises:
    a device that performs at least one of input and output;
    a device power control unit that controls power supply to the device; and
    a device power supply control instruction unit that instructs the device power supply control unit to stop power supply to the device based on an instruction from an operation unit disposed in the apparatus, wherein stopping power supply to the device makes it possible to set the device that is fixedly connected in the apparatus to a pseudo removed state.
(Supplementary Note 10)
The computer system according to supplementary note 9, wherein the device power supply control instruction unit, on elapse of a predetermined time after instructing the device power supply control unit to stop the power supply to the device, instructs the device power supply control unit to provide power supply to the device.
(Supplementary Note 11)
The computer system according to supplementary note 9, wherein the device power supply control instruction unit, after confirming that the power supply to the device is stopped and the device is in a pseudo removed state from the host device to which the remote terminal apparatus connects and instructs the device power supply control unit to provide power supply to the device.
(Supplementary Note 12)
The computer system according to any one of supplementary notes 9 to 11, wherein the operation unit includes a button configured to instruct to stop power supply to the device responsive to pressing down of the button.
(Supplementary Note 13)
The computer system according to supplementary note 12, wherein when the button is pressed, the device power supply control instruction unit instructs the device power supply control unit to stop power supply to the device, and instructs a host to which the remote terminal apparatus connects to start monitoring of a connection state of the device, and wherein
  the device power supply control instruction unit instructs the device power supply control unit to provide power supply to the device upon reception of notification from the host that the device is confirmed to be in a pseudo removed state.
(Supplementary Note 14)
A device control method of a remote terminal apparatus, the method comprising:
  instructing to stop to provide power supply to the device, on reception of an instruction of stopping power supply of a device that is fixedly connected in the apparatus and performs input/output in response to an operation at an operation unit; and stopping power supply to the device, thereby making it possible to set the device to a pseudo removed state.
(Supplementary Note 15)
The device control method of a remote terminal apparatus according to supplementary note 14, comprising
  instructing the device power supply control unit to provide power supply to the device, on elapse of a predetermined time after instructing the device power supply control unit to stop the power supply to the device.
(Supplementary Note 16)
The device control method of a remote terminal apparatus according to supplementary note 14, comprising
  after it is confirmed that the power supply to the device is stopped and the device is in a pseudo removed state by an upper apparatus to which the remote terminal apparatus connects,
  instructing to provide power supply to the device.
(Supplementary Note 17)
The device control method of a remote terminal apparatus according to supplementary note 14, comprising:
  when a button constituting the operation unit is pressed, instructing to stop power supply to the device, and instructing a host to which the remote terminal apparatus connects to start monitoring of a connection state of the device; and
  instructing the device power supply control unit to provide power supply to the device upon reception of notification from the host that the device is confirmed to be in a pseudo removed state.
(Supplementary Note 18)
The device control method of a remote terminal apparatus according to any one of supplementary notes 14 to 17, comprising:
  after power supply is stopped, when receiving power supply from the device power control unit, the device performing initialization procedure and then normal operation.
(Supplementary Note 19)
The device control method of a remote terminal apparatus according to supplementary note 17 or 18, wherein the device communicates with a processor of the host as an input/output device connected to a bus that extends an internal bus of the host to the network.
(Supplementary Note 20)
A non-transitory computer-readable recording medium storing therein a program causing a processor constituting a remote terminal apparatus to execute
  a device power control process that controls power supply to a device that is fixedly connected in the apparatus and performs input and output; and
  a device power supply control instruction process that instructs to stop power supply to the device based on an instruction from an operation unit disposed in the apparatus.
(Supplementary Note 21)
The non-transitory computer-readable recording medium according to supplementary note 20, storing the program causing the processor to execute a process of instructing to provide power supply to the device, on elapse of a predetermined time after instructing to stop power supply to the device.

(Supplementary Note 22)

The non-transitory computer-readable recording medium according to supplementary note 20, storing the program causing the processor to execute a process of instructing the device power supply control unit to provide power supply to the device after a stop of power supply to the device is confirmed by an upper apparatus to which the remote terminal apparatus connects.

(Supplementary Note 23)

The non-transitory computer-readable recording medium according to supplementary note 20 or 22, storing the program causing the processor to execute a process of when a button constituting the operation unit is pressed, instructing to stop power supply to the device, and instructing a host to start monitoring of a connection state of the device; and a process of instructing to provide power supply to the device upon reception of notification from the host that the device is confirmed to be in a pseudo removed state.

(Supplementary Note 24)

A non-transitory computer-readable recording medium storing therein a program executed on a host connected via a network to a remote terminal apparatus including a device that is fixedly connected to the apparatus and performs input and output to cause a processor to execute the processing comprising:

monitoring a state of the device in the remote terminal apparatus connected via the network, upon receiving an instruction to start monitoring a connection state of the device from the remote terminal apparatus; and notifying to the remote terminal apparatus that removal of the device is confirmed upon detection that the device is in a pseudo removed state in the remote terminal apparatus.

(Supplementary Note 25)

An TO device that performs at least one of input and output;

a device power control unit that controls power supply to the device; and a device power supply control instruction unit that instructs the device power supply control unit to stop power supply to the device based on an instruction from an operation unit disposed in the apparatus, wherein it is made possible to set the device fixedly connected in the apparatus to a removed state in a pseudo manner by stopping a power supply to the device.

The disclosures of the above described Patent Literature 1 and Non-Patent Literature 1 are incorporated herein by reference. Within the framework of the entire disclosure (including the scope of claims) of the present invention, it is possible to change/adjust the embodiments or examples based on the basic technical thought. Furthermore, various combinations or selections of various disclosed elements (including each element of each appendix, each element of each embodiment, each element of each drawing, etc.) are possible within the scope of the claims of the present invention. That is, it goes without saying that the present invention includes various kinds of variations and modifications that could be made by those skilled in the art according to the entire disclosure including the claims, and technical ideas.

The invention claimed is:

1. A remote terminal apparatus comprising:
a device that performs at least one of input and output;
a device power control unit that controls power supply to the device; and
a device power supply control instruction unit that instructs the device power supply control unit to stop power supply to the device based on an instruction from an operation unit arranged in the remote terminal apparatus,
wherein stopping power supply to the device sets the device that is fixedly connected in the remote terminal apparatus to a pseudo removed state, and
wherein after it is confirmed, by a host to which the remote terminal apparatus connects, that the power supply to the device is stopped and the device is in the pseudo removed state, the device power supply control instruction unit instructs the device power supply control unit to provide power supply to the device.

2. The remote terminal apparatus according to claim 1, wherein the operation unit includes a button configured to instruct to stop power supply to the device responsive to pressing down of the button.

3. The remote terminal apparatus according to claim 2, wherein when the button is pressed,
the device power supply control instruction unit instructs the device power supply control unit to stop power supply to the device, and instructs the host apparatus connects to start monitoring of a connection state of the device, and wherein
the device power supply control instruction unit instructs the device power supply control unit to provide power supply to the device upon reception of notification from the host that the device is confirmed to be in the pseudo removed state.

4. The remote terminal apparatus according to claim 1, wherein when receiving power supply from the device power control unit after the power supply to the device is stopped, the device performs initialization procedure and then performs normal operation.

5. The remote terminal apparatus according to claim 1, comprising a network interface that connects to the host via a network, wherein the device communicates with a processor of the host as an input/output device connected to a bus that extends an internal bus of the host to the network.

6. A host connected via a network to the remote terminal apparatus according to claim 1, wherein the host comprises
a device monitoring unit that on reception of an instruction to start monitoring a connection state of the device from the remote terminal apparatus, monitors a state of the device, and
notifies the remote terminal device that pseudo removal of the device is confirmed, when detecting that the device is removed in a pseudo manner.

7. A computer system comprising:
a host; and
the remote terminal apparatus according to claim 1,
wherein the remote terminal apparatus is an IO device virtually extending an internal bus of the host on a network.

8. A remote terminal apparatus comprising:
a device that performs at least one of input and output;
a device power control unit that controls power supply to the device; and
a device power supply control instruction unit that instructs the device power supply control unit to stop power supply to the device based on an instruction from an operation unit arranged in the remote terminal apparatus,
wherein stopping power supply to the device sets the device that is fixedly connected in the remote terminal apparatus to a pseudo removed state, and wherein on elapse of a predetermined time after instructing the device power supply control unit to stop the power supply to the device, the device power supply control instruction unit instructs the device power supply control unit to provide power supply to the device.

9. A device control method of a remote terminal apparatus, the method comprising:
instructing to stop to provide power supply to a device that is fixedly connected in the remote terminal apparatus and performs input/output in response to an operation at an operation unit disposed in the remote terminal apparatus, on reception of an instruction of stopping power supply of the device;
stopping power supply to the device to set the device to a pseudo removed state; and
instructing a device power supply control unit included in the remote terminal apparatus to provide power supply to the device, after it is confirmed, by a host to which the remote terminal apparatus connects, that the power supply to the device is stopped and the device is in the pseudo removed state.

10. The method according to claim 9, comprising:
when a button constituting the operation unit is pressed, instructing to stop power supply to the device, and instructing the host to start monitoring of a connection state of the device; and
instructing the device power supply control unit to provide power supply to the device, upon reception of notification from the host that the device is confirmed to be in the pseudo removed state.

11. The method according to claim 9, comprising:
when receiving power supply after the power supply to the device is stopped, the device performing initialization procedure and then performing normal operation.

12. The method according to claim 10, comprising
the device communicating with a processor of the host as an input/output device connected to a bus that extends an internal bus of the host to the network.

13. A device control method of a remote terminal apparatus, the method comprising:
instructing to stop to provide power supply to a device that is fixedly connected in the remote terminal apparatus and performs input/output in response to an operation at an operation unit disposed in the remote terminal apparatus, on reception of an instruction of stopping power supply of the device;
stopping power supply to the device to set the device to a pseudo removed state; and
instructing a device power supply control unit included in the remote terminal apparatus to provide power supply to the device, on elapse of a predetermined time after instructing to stop the power supply to the device.

14. A non-transitory computer-readable recording medium storing therein a program causing a processor constituting a remote terminal apparatus to execute
a device power control process that controls power supply to a device that is fixedly connected in the remote terminal apparatus and performs input and output; and
a device power supply control instruction process that instructs the device power control process to stop power supply to the device based on an instruction from an operation unit disposed in the apparatus, wherein
the device power supply control instruction process instructs the device power control process to provide power supply to the device, after it is confirmed, by a host to which the remote terminal apparatus connects, that the power supply to the device is stopped and the device is in a pseudo removed state.

15. The non-transitory computer-readable recording medium according to claim 14, storing the program causing the processor to execute the device power supply control instruction process that when a button constituting the operation unit is pressed, instructs the device power control process to stop power supply to the device, and instructs the host to start monitoring of a connection state of the device; wherein
the device power supply control instruction process that instructs device power control process to provide power supply to the device upon reception of notification from the host that the device is confirmed to be in the pseudo removed state.

16. A non-transitory computer-readable recording medium storing therein a program causing a processor constituting a remote terminal apparatus to execute
a device power control process that controls power supply to a device that is fixedly connected in the remote terminal apparatus and performs input and output; and
a device power supply control instruction process that instructs the device power control process to stop power supply to the device based on an instruction from an operation unit disposed in the apparatus, wherein
the device power supply control instruction process instructs the device power control process to provide power supply to the device on elapse of a predetermined time after instructing the device power control process to stop power supply to the device.

* * * * *